United States Patent [19]
Naitoh et al.

[11] Patent Number: 5,728,643
[45] Date of Patent: Mar. 17, 1998

[54] NO$_x$ DECOMPOSITION CATALYST AND EXHAUST GAS PURIFIER USING SAID CATALYST

[75] Inventors: Isao Naitoh, Oiso-machi; Kazuo Ohsumi, Fujisawa, both of Japan

[73] Assignee: Isuzu Ceramics Research Institute Co., Ltd., Kanagawa-ken, Japan

[21] Appl. No.: 788,779

[22] Filed: Jan. 24, 1997

[30] Foreign Application Priority Data

| Feb. 9, 1996 | [JP] | Japan | 8-046955 |
| Mar. 22, 1996 | [JP] | Japan | 8-093642 |
| May 17, 1996 | [JP] | Japan | 8-146534 |

[51] Int. Cl.$^6$ .......................... B01J 23/00; B01J 23/40; B01J 23/58

[52] U.S. Cl. .......................... 502/302; 502/303; 502/304; 502/306; 502/311; 502/314; 502/315; 502/316; 502/318; 502/320; 502/327; 502/328; 502/331; 502/332; 502/341; 502/346; 502/351; 502/354

[58] Field of Search .......................... 502/302, 306, 502/311, 314, 318, 320, 327, 328, 331, 332, 341, 346, 351, 354, 315, 316, 303, 304

[56] References Cited

U.S. PATENT DOCUMENTS

| 4,921,829 | 5/1990 | Ozawa et al. | 502/302 |
| 5,380,692 | 1/1995 | Nakatsuji et al. | 502/302 |
| 5,559,073 | 9/1996 | Hu et al. | 502/302 |

FOREIGN PATENT DOCUMENTS

| 0 089 199 | 9/1983 | European Pat. Off. | B01J 23/02 |
| 0 532 024 A | 3/1993 | European Pat. Off. | B01D 53/36 |
| 0 663 232 A | 7/1995 | European Pat. Off. | B01D 53/22 |
| 0 742 352 A | 11/1996 | European Pat. Off. | F01N 3/02 |
| 52-060286 | 5/1977 | Japan . | |
| 54-119384 | 9/1979 | Japan . | |
| 58-027623 | 2/1983 | Japan . | |
| 59-059249 | 4/1984 | Japan . | |
| 63-077543 | 4/1988 | Japan . | |
| 6-100319 | 4/1994 | Japan . | |
| 6-315634 | 11/1994 | Japan . | |
| 8-057315 | 3/1996 | Japan . | |
| 8-155303 | 6/1996 | Japan . | |
| 8-188466 | 7/1996 | Japan . | |
| 90/08589 | 8/1990 | WIPO | B01D 53/36 |
| WO94/25143 | 11/1994 | WIPO . | |

OTHER PUBLICATIONS

Mori et al, "Influence of Oxygen Ion Conduction on Nitric Oxide Decomposition", *J. Am. Ceram. Soc.*, 77(10):2771–2772 (Aug. 1994).

*Primary Examiner*—Walter D. Griffin
*Assistant Examiner*—In Suk Bullock
*Attorney, Agent, or Firm*—Browdy and Neimark

[57] ABSTRACT

The present invention provides an NO$_x$ decomposition catalyst which can decompose NO$_x$ in exhaust gas to decrease the amount of NO$_x$ in exhaust gas and is improved in durability through suppression of thermal decomposition thereof, and an exhaust gas purifier wherein said catalyst is used. This NO$_x$ decomposition catalyst is a compound having a brownmillerite type structure represented by the general formula: $A_{3-x}B_xC_{4-y}D_yO_z$, the carbon content of which compound may be at most 1.25 wt. %. This NO$_x$ decomposition catalyst can be used in an exhaust gas purifier applicable to an internal combustion engine.

9 Claims, 7 Drawing Sheets

Relationship between C:D site ion ratio and rate of removal

Relationship between specific surface area and rate of removal

Change in rate of NOx removal with time

○ : Ex.15   ▲ : Ex.17
◇ : Ex.16   ▽ : Comp. Ex.1

Reactive gas : nitrogen monoxide 800 ppm,
propene 600 ppm,
oxygen 10%,
balance of nitrogen Reaction temperature : 500 °C SV : 100000/h Rates of NOx removal by respective samples after 600 minutes from start of test Reactive gas: nitrogen monoxide 800 ppm,
propen 600 ppm,
oxygen 10%,
barance of nitrogen Reaction temperature: 500 °C SV: 100000/h

NO$_x$ DECOMPOSITION CATALYST AND EXHAUST GAS PURIFIER USING SAID CATALYST

BACKGROUND OF THE INVENTION

1. Field of the Invention

The present invention relates to an NO$_x$ reduction catalyst, for example, capable of purifying exhaust gas by reduction of NO$_x$ contained in exhaust gas, and an exhaust gas purifier wherein said catalyst is used.

2. Description of the Prior Art

Catalytic reduction catalysts and direct decomposition catalysts have heretofore been known as NO$_x$ decomposition catalysts. There has been known a ternary catalyst for use in a gasoline engine wherein platinum and rhodium are used as a catalyst while using HC, CO and H$_2$ in exhaust gas as a reducing agent. In the case of the ternary catalyst, which is alumina, zeolite or noble metals borne on such a carrier, however, the rate of reduction of NO$_x$ is low in an oxygen-excessive attenuated combustion region, i.e., a lean burn region, as well as in a diesel engine. Thus, the ternary catalyst is ineffective in purifying exhaust gas discharged from a diesel engine. More specifically, since combustion is carried out at an excessive proportion of air in the diesel engine, O$_2$ exists in exhaust gas to entail discharge of a large amount of nitrogen oxides NO$_x$.

By contrast, since combustion is carried out at a theoretical mixing ratio in a gasoline engine, not much O$_2$ exists in exhaust gas and NO is decomposed by the action of a reduction catalyst provided downstream of the engine, thus involving no problem with NO$_x$.

There have heretofore been exhaust gas purifiers having a variety of respective NO$_x$ decomposition catalysts incorporated thereinto in order to suppress outward discharge of nitrogen oxides NO$_x$ from diesel engines. Since a large amount of O$_2$ is contained in diesel engine exhaust gas, however, it involves a drawback that these catalysts do not work well.

In view of the above, perovskite type catalysts have been developed for decomposition of NO$_x$ in a diesel engine as well as in the attenuated combustion region, i.e., the lean burn region, but involves a problem that the rate of reduction of NO$_x$ is low (see, for example, Japanese Patent Laid-Open No. 100,319/1994 and Japanese Patent Laid-Open No. 315,634/1994). Japanese Patent Laid-Open No. 77,543/1988 discloses an exhaust gas purification catalyst comprising a catalyst carrier, a perovskite type composite oxide composed of an alkaline earth metal oxide, a lanthanum oxide and a cerium oxide and borne on the surfaces of the catalyst carrier, and a noble metal catalyst component also borne on the surfaces of the catalyst carrier. Japanese Patent Laid-Open No. 77,543/1988 further discloses an exhaust gas purification catalyst comprising a catalyst carrier having the surfaces thereof provided with layers comprising a perovskite type composite oxide and an O$_2$-storage type rare earth element oxide, and Pd or Pd and other noble metal borne as a catalyst component on the surfaces of the catalyst carrier.

In view of the foregoing circumstances, investigations have been made into various catalysts, which include, as NO$_x$ reduction catalysts, compounds having a brownmillerite type structure capable of direct reduction decomposition of NO$_x$ without need of any reducing agents, examples of which include such compounds as Ba$_3$Y$_4$O$_9$ and BaLa$_2$O$_4$. However, catalysts comprising such a compound have such a suitable activation temperature for a reduction reaction of NO$_x$ as to lower the rate of reduction thereof at low temperatures, and involves a problem with durability.

Meanwhile, the durability of a brownmillerite type structure compound is lowered through thermal decomposition thereof, which occurs through, for example, the following systems. The following systems (1) to (6) are developed in this order or in parallel.

(1) Carbon contained in a compound having a brownmillerite type structure is oxidized with oxygen in air. [C+O$_2$→CO$_n$ (wherein n is an arbitrary number of 1 or 2)]

(2) Ba ions and O ions contained in the compound having a brownmillerite type structure are reacted with CO$_n$ to become barium carbonate. [Ba$^{2+}$+O$_2$-+CO$_n$→BaCO$_3$]

(3) Y ions contained in the compound having a brownmillerite type structure, which have become excessive through the reaction of barium, are reacted with O ions in the above-mentioned compound and oxygen in air to become yttrium oxide. [2Y$^{3+}$+O$^{2-}$+O$_2$→Y$_2$O$_3$]

(4) Barium carbonate is decomposed into barium oxide. [BaCO$_3$+nO$_2$→BaO$_m$+CO$_2$ (wherein m is an arbitrary number of 1 or 2)]

(5) Barium oxide is reacted with yttrium oxide to become a perovskite type compound. [BaO$_m$+Y$_2$O$_3$→BAY$_2$O$_4$]

(6) The brownmillerite type structure compound is converted into a perovskite type compound. [Ba$_3$Y$_4$O$_9$→xBaY$_2$O$_4$] (wherein x is 2 to 3, provided that the latter involves defects)]

SUMMARY OF THE INVENTION

An object of the present invention is to provide an NO$_x$ decomposition catalyst having a capability of purifying exhaust gas discharged from a diesel engine through reduction of NO$_x$ contained therein and improved in durability by selecting constituent elements of a compound having a brownmillerite type structure represented by the general formula: A$_{3-x}$B$_x$C$_{4-y}$D$_y$O$_Z$ as a catalyst component, and synthesizing the compound by a wet process in such a way as to secure a suitable NO$_x$-reducing capability through selection of the catalyst components, i.e., the constituent elements, and variation of the firing temperature in synthesis for a decrease in the amount of carbon in the form of free carbon, carbonic acid salts, etc. trapped in the compound for suppression of thermal decomposition of the compound; and an exhaust gas purifier applicable to an internal combustion engine, wherein the above-mentioned catalyst is used.

The present invention is directed to an NO$_x$ decomposition catalyst comprising a catalyst component having a brownmillerite type structure represented by the general formula: A$_{3-x}$B$_x$C$_{4-y}$D$_y$O$_Z$, wherein the A site, the B site, the C site and the D site each comprise at least 1 element selected from each corresponding group consisting of the following elements, and X, Y and Z are in the following respective ranges:

A: Mg, Ca, Sr, and Ba;
B: Ti, V, Cr, Mn, Fe, Co, Ni, Cu, Nb, Zr, Mo, Sn, Hf, Al, Ga, Ge, Tc, Ag, In, Sb, and lanthanoids;
C: lanthanoids;
D: Y and lanthanoids; and
0<X≦1.5, 0<Y≦2.0, and 7≦Z.

This NO$_x$ decomposition catalyst may be at most 24 eV in the bivalent-to-trivalent ionization potential of a B site ion on the B site.

This NO$_x$ decomposition catalyst may comprise the catalyst component comprising Ba on the A site; at least 1 element selected from the element group consisting of Hf, Ce, Zr, Fe, Co, Ni and Cu on the B site; Y on the C site; and at least 1 element selected from the element group consisting of La and Ce on the D site.

This $NO_x$ decomposition catalyst may be at least 1 $m^2/gr$ in specific surface area.

Since this $NO_x$ decomposition catalyst has the foregoing constitution, the compound having a brownmillerite type structure, when heated, undergoes such phase transition that $NO_x$ present in exhaust gas can be decomposed either by virtue of disordered oxygen defects or by electron donation or elimination through a change in the valence of a constituent element. Thus, a high rate of $NO_x$ removal can be attained by the catalytic and adsorptive activities of the above-mentioned compound involved in the $NO_x$ decomposition action thereof to decrease the amount of $NO_x$ present in exhaust gas.

Since ceramic particles having a brownmillerite structure are used in this $NO_x$ decomposition catalyst as described above, an $NO_x$ decomposition catalyst having high catalytic and adsorptive activities and having no need of use of any expensive noble metals as have hitherto been used can be provided, whereby $NO_x$ contained in exhaust gas can be efficiently decomposed to be converted into $N_2$ and $O_2$ to thereby decrease the amount of $NO_x$ in exhaust gas.

Since this $NO_x$ decomposition catalyst comprises the compound having a brownmillerite type structure in the catalyst components for exhaust gas purification while the carbon content of the above-mentioned compound may be decreased to at most 1.25 wt. %, the thermal decomposition of the above-mentioned compound, i.e., a composite oxide, can be suppressed to improve the durability thereof. Moreover, since this $NO_x$ decomposition catalyst can provide a high $NO_x$-decomposing power involving high catalytic and adsorptive activities while having no need to use any expensive noble metals, $NO_x$ contained in exhaust gas can be efficiently decomposed to be converted into $N_2$ and $O_2$ to thereby decrease the amount of $NO_x$ in exhaust gas when the catalyst is applied to an exhaust gas purifier.

More specifically, since the compound having a brownmillerite type structure in this $NO_x$ decomposition catalyst, when heated, undergoes such phase transition that $NO_x$ present in exhaust gas can be decomposed either by virtue of disordered oxygen defects or by electron donation or elimination through a change in the valence of a constituent element, a high rate of $NO_x$ removal can be attained by the high catalytic and adsorptive activities of the above-mentioned compound involved in the $NO_x$ decomposition action thereof to decrease the amount of $NO_x$ present in exhaust gas, while the durability of the catalyst can be enhanced.

This $NO_x$ decomposition catalyst may comprise the compound represented by the aforementioned general formula (e.g., $Ba_{2.97}, Cu_{0.03}, Y_{3.96}, Dy_{0.04}, O_7$); a perovskite type compound containing any ones of the constituent elements A, B, C and D in the aforementioned general formula and represented by the general formula: $(A,B)(C,D)_2O_4$ (e.g., $BAY_2O_3$); a carbonate of a constituent element A, B, C or D of the above-mentioned compound (e.g., $BaCO_3$); and an oxide (e.g., $BaO_2$ or $Y_2O_3$).

In the foregoing $NO_x$ decomposition catalyst, the brownmillerite type structure compound, after being decomposed through exhaust gas purification, is restored to the original structure when it is heated. By contrast, in a catalyst comprising a brownmillerite type structure compound alone, this compound, after being decomposed, is not restored to the original structure even when it is heated. In connection with reactions involved in the restoration of the structure, it is believed that the carbonate as one component, when heated, is decomposed into an oxide and carbon monoxide, which takes oxygen from the oxide and the perovskite type compound to convert decomposition products into the brownmillerite type structure compound.

In view of the above, this $NO_x$ decomposition catalyst, when deteriorated in catalytic action to be lowered in the capability of decomposing $NO_x$ in exhaust gas, is forcibly heated to, for example, around 900° C. with a heater such as an electric heater to regenerate the catalyst, whereby the $NO_x$-decomposing capability thereof can be maintained.

Where this $NO_x$ decomposition catalyst is used in an exhaust gas purifier, a heater is provided as described above, which can also be used to heat and incinerate particulates, discharged from a diesel engine and attached to the surfaces of the catalyst to lower the $NO_x$-decomposing capability of the catalyst, whereby the particulates attached to the catalyst can be removed. Thus, the heater is also an effective means for removal of particulates.

The present invention is also directed to an exhaust gas purifier characterized in that it is constituted of at least one carrier selected from among a carrier having a honeycomb structure, a carrier having a foam structure, and a carrier having a fiber structure, and in that layers of a composition comprising a compound as set forth in claim 1 or 2 are disposed on the carrier.

The present invention is further directed to an exhaust gas purifier characterized in that it is constituted of at least one carrier selected from among a carrier having a honeycomb structure, a carrier having a foam structure, and a carrier having a fiber structure, and in that a composition comprising a compound as set forth in claim 1 or 2 is contained in the carrier.

As described above, according to the present invention, the aforementioned $NO_x$ decomposition catalyst can be used in the exhaust gas purifier either in such a way as to be contained in the carrier constituting a filter or in such a way as to cover the carrier constituting a filter by coating or the like. As the carrier constituting the filter, there can be mentioned a carrier having a honeycomb structure, a carrier having a foam structure, and a carrier having a fiber structure.

This $NO_x$ decomposition catalyst may comprise the brownmillerite type compound, a perovskite type compound containing at least 2 elements of the constituent elements of the brownmillerite type compound, a carbonate of at least 1 element of the constituent elements of the brownmillerite type compound, and an oxide of at least 1 element of the constituent elements of the brownmillerite type compound. When this $NO_x$ decomposition catalyst is deteriorated in catalytic action to be lowered in $NO_x$-decomposing capability, the catalyst deteriorated in catalytic action is forcibly heated with a heater to restore the $NO_x$-decomposing capability of the catalyst, whereby the $NO_x$-decomposing capability thereof can be maintained over a long period.

When the decomposed catalyst is forcibly heated with a heater, particulates, contained in exhaust gas discharged from a diesel engine and then attached to the surfaces of the catalyst, are heated and can hence be incinerated to be removed, whereby the physical function of the catalyst can be restored to enable the function of the catalyst to work effectively.

DETAILED DESCRIPTION OF THE EMBODIMENTS

Figure 1:
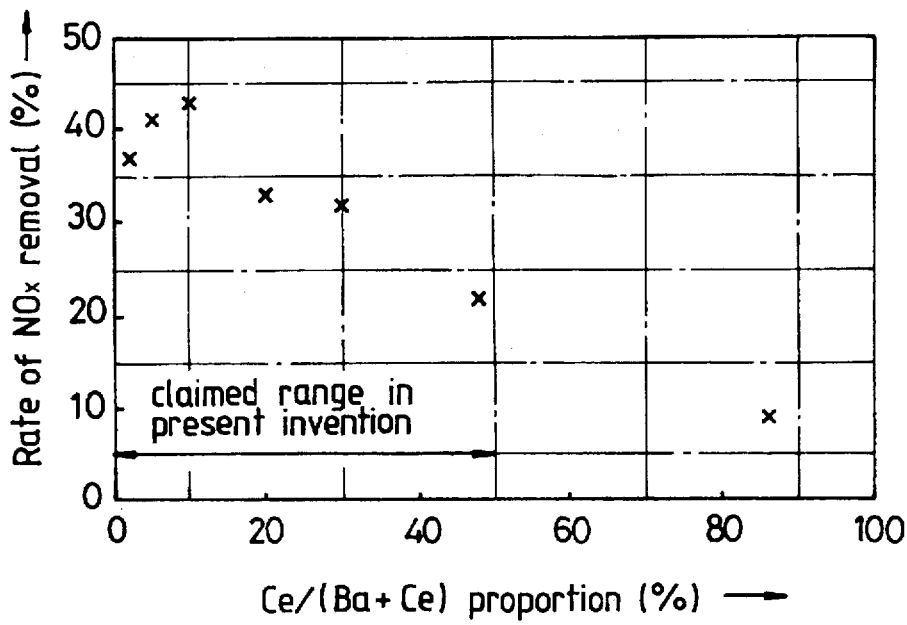
FIG. 1 is a graph showing the relationship between the proportion of B site ions (Ce) to the total ions (Ce+Ba) of A site ions (Ba) and the B site ions (Ce), and the rate of $NO_x$ removal in $NO_x$ decomposition catalysts according to the present invention.

An example of the $NO_x$ decomposition catalyst of the present invention will now be described. This $NO_x$ decomposition catalyst is applicable, for example, to an exhaust gas purifier for purifying exhaust gas discharged from a diesel engine by decreasing the amount of $NO_x$ in exhaust gas. In general, a diesel engine has a cylinder head fixed to a cylinder block with a gasket therebetween, intake and exhaust ports formed through the cylinder head, a cylinder liner provided in the cylinder block, and a piston reciprocating inside a cylinder bore formed in the cylinder liner. The exhaust port communicates with an exhaust pipe, which is provided with an exhaust gas purifier. This $NO_x$ decomposition catalyst is used for incorporation thereof into such an exhaust gas purifier to decompose $NO_x$ for conversion of $NO_x$ into $N_2$ and $O_2$, whereby the amount of $NO_x$ in exhaust gas discharged from a diesel engine is decreased.

The $NO_x$ decomposition catalyst of the present invention comprises a catalyst component having a brownmillerite type structure represented by the general formula: $A_{3-X}B_XC_{4-Y}D_YO_Z$, wherein the A site, the B site, the C site and the D site each comprise at least 1 element selected from each corresponding group consisting of the following elements, and X, Y and Z are in the following respective ranges:

Specifically, the A site contains at least 1 element selected from the element group consisting of Mg, Ca, Sr, and Ba; the B site contains at least 1 element selected from the element group consisting of Ti, V, Cr, Mn, Fe, Co, Ni, Cu, Nb, Zr, Mo, Sn, Hf, Al, Ga, Ge, Tc, Ag, In, Sb, and lanthanoids; the C site contains at least 1 element selected from the element group consisting of lanthanoids; and D site contains at least 1 element selected from the element group consisting of Y and lanthanoids; while X is in the range: $0 < X \leq 1.5$, Y is in the range: $0 < Y \leq 2.0$, and Z is in the range: $7 \leq Z$. When the numerical values of X, Y and Z fall in these ranges, the brownmillerite type structure is maintained electrically neutral.

This $NO_x$ decomposition catalyst may be at most 24 eV in the bivalent-to-trivalent ionization potential of a B site ion on the B site. This $NO_x$ decomposition catalyst may be at least 1 $m^2/gr$ in specific surface area. In this $NO_x$ decomposition catalyst, it is especially preferred that the catalyst component contain Ba on the A site, at least 1 element selected from the element group consisting of Hf, Ce, Zr, Fe, Co, Ni and Cu on the B site, La on the C site, and at least 1 element selected from the element group consisting of Y and Ce on the D site.

On the other hand, this exhaust gas purifier has the foregoing $NO_x$ decomposition catalyst incorporated thereinto either in such a way as to be contained in a carrier constituting a filter or in such a way as to cover such a carrier by coating or the like, whereby the catalyst is used to decompose $NO_x$ in exhaust gas discharged from the diesel engine for conversion of $NO_x$ into $N_2$ and $O_2$ to thereby decrease the amount of $NO_x$ in exhaust gas. In this exhaust gas purifier, the carrier constituting the filter may be at least one carrier selected from among a carrier having a honeycomb structure, a carrier having a foam structure, and a carrier having a fiber structure.

On the other hand, in this $NO_x$ decomposition catalyst comprising the exhaust gas purification catalyst component comprising the compound having a brownmillerite type structure, the above-mentioned compound may have a feature that the carbon content thereof is at most 1.25 wt. %. The thermal decomposition of this $NO_x$ decomposition catalyst can be suppressed to improve the durability of the catalyst when the carbon content of the brownmillerite type structure compound is lowered to at most 1.25 wt. %.

[Example 1]

In Example 1, 1.5 mol of barium acetate and 1.6 mol of yttrium nitrate were weighed, and dissolved in water. The resulting solution was pH-adjusted with aqueous ammonia with stirring to be, for example, weakly alkaline, and was further stirred until the solution became homogeneous. Subsequently, the resulting solution was heated on a hotting stirrer (hot plate) to remove water. The resulting precursor was then pulverized to prepare a powder. This powder was heated in air at 600° C. to remove the nitrate groups and the acetate groups from the powder. Subsequently, the powder stripped of the nitrate groups and the acetate groups was pulverized again. The resulting powder was fired in an Ar atmosphere at 900° C. When the powder obtained through the foregoing steps was examined by X-ray diffractometry, it could be confirmed that the powder was a composite oxide having a brownmillerite type structure.

[Example 2]

In Example 2, substantially the same procedure as in Example 1 was repeated except that the powder firing temperature was varied in the range of 500° C. to 1,400° C. instead of the powder firing temperature of 900° C. to effect powder firing in an Ar atmosphere. Thus, composite oxides having a brownmillerite type structure could be obtained like in Example 1.

[Example 3]

In Example 3, 1.47 mol of barium acetate, 0.024 mol of cerium nitrate and 1.6 mol of yttrium nitrate were weighed, and dissolved in water. The resulting solution was pH-adjusted with aqueous ammonia with stirring to be, for example, weakly alkaline, and was further stirred until the solution became homogeneous. Subsequently, the resulting solution was heated on a hotting stirrer to remove water. The resulting precursor was then pulverized to prepare a powder. This powder was heated in air at 600° C. to remove the nitrate groups and the acetate groups from the powder. Subsequently, the powder stripped of the nitrate groups and the acetate groups was pulverized again. The resulting powder was fired in an Ar atmosphere at 950° C. When the powder obtained through the foregoing steps was examined by X-ray diffractometry, it could be confirmed that the powder was a composite oxide having a brownmillerite type structure.

[Example 4]

In Example 4, 1.6 mol of yttrium nitrate, and barium acetate and cerium nitrate in amounts varied as shown in Table 1 were weighed, and dissolved in water. The resulting solutions were respectively subjected to the same steps as in Example 3 to obtain powders. When these powders were examined by X-ray diffractometry, it could be confirmed that these powders were respective composite oxides having a brownmillerite type structure.

TABLE 1

| Kind of Element | Sample 1 | Sample 2 | Sample 3 | Sample 4 | Sample 5 | Sample 6 |
| --- | --- | --- | --- | --- | --- | --- |
| Ba (mol.) | 0.2 | 0.5 | 0.8 | 1.2 | 1.35 | 1.45 |
| Ce (mol). | 1.03 | 0.58 | 0.36 | 0.24 | 0.12 | 0.06 |

[Example 5]

In Example 5, 1.47 mol of barium acetate, 0.024 mol of hafnium nitrate and 1.6 mol of yttrium nitrate were weighed, and dissolved in water. The resulting solution was pH-adjusted with aqueous ammonia with stirring to be, for example, weakly alkaline, and was further stirred until the solution became homogeneous. Subsequently, the resulting solution was heated on a heating stirrer to remove water. The resulting precursor was then pulverized to prepare a powder. This powder was heated in air at 600° C. to remove the nitrate groups and the acetate groups from the powder. Subsequently, the powder stripped of the nitrate groups and the acetate groups was pulverized again. The resulting powder was fired in an Ar atmosphere at 950° C. When the powder obtained through the foregoing steps was examined by X-ray diffractometry, it could be confirmed that the powder was a composite oxide having a brownmillerite type structure.

[Example 6]

In Example 6, 1.6 mol of yttrium nitrate, and barium acetate and hafnium nitrate in amounts varied as shown in Table 2 were weighed, and dissolved in water. The resulting solutions were respectively subjected to the same steps as in Example 5 to obtain powders. When these powders were examined by X-ray diffractometry, it could be confirmed that these powders were respective composite oxides having a brownmillerite type structure.

TABLE 2

| Kind of Element | Sample 1 | Sample 2 | Sample 3 | Sample 4 | Sample 5 | Sample 6 |
| --- | --- | --- | --- | --- | --- | --- |
| Ba (mol.) | 0.2 | 0.5 | 0.8 | 1.2 | 1.35 | 1.45 |
| Hf (mol). | 1.03 | 0.58 | 0.36 | 0.24 | 0.12 | 0.06 |

[Example 7]

Substantially the same production steps as in Examples 5 and 6 were taken to obtain powders except that a variety of metal nitrate was used instead of hafnium nitrate as used in Examples 5 and 6. The following elements could be selected as a metal constituting a metal nitrate. In this case, the starting materials were blended together at the same mixing ratio as in Example 5 as well as 6. Although the metal could be selected from among Ti, V, Cr, Mn, Fe, Co, Ni, Cu, Nb, Zr, Mo and Sn, Sn was particularly selected in Example 7. When these powders were examined by X-ray diffractometry, it could be confirmed that these powders were respective composite oxides having a brownmillerite type structure.

[Example 8]

In Example 8, 1.2 mol of strontium acetate and 1.6 mol of yttrium nitrate were weighed, and dissolved in water. The resulting solution was pH-adjusted with aqueous ammonia with stirring to be, for example, weakly alkaline, and was further stirred until the solution became homogeneous. Subsequently, the resulting solution was heated on a heating stirrer to remove water. The resulting precursor was then pulverized to prepare a powder. This powder was heated in air at 600° C. to remove the nitrate groups and the acetate groups from the powder. Subsequently, the powder stripped of the nitrate groups and the acetate groups was pulverized again. The resulting powder was fired in an Ar atmosphere at 900° C. When the powder obtained through the foregoing steps was examined by X-ray diffractometry, it could be confirmed that the powder was a composite oxide having a brownmillerite type structure.

[Example 9]

In Example 9, substantially the same procedure as in Example 8 was repeated to obtain a powder except that 1.6 mol of yttrium nitrate and calcium acetate were selected as the starting materials. When the powder was examined by X-ray diffractometry, it could be confirmed that the powder was a composite oxide having a brownmillerite type structure.

[Example 10]

In Example 10, substantially the same procedure as in Example 8 was repeated to obtain a powder except that 1.6 mol of yttrium nitrate and magnesium acetate were selected as the starting materials. When the powder was examined by X-ray diffractometry, it could be confirmed that the powder was a composite oxide having a brownmillerite type structure.

[Example 11]

In Example 11, 1.2 mol of barium acetate, 1.57 mol of yttrium nitrate and 0.03 mol of lanthanum nitrate were weighed, and dissolved in water. The resulting solution was pH-adjusted with aqueous ammonia with stirring to be, for example, weakly alkaline, and was further stirred until the solution became homogeneous. Subsequently, the resulting solution was heated on a heating stirrer to remove water. The resulting precursor was then pulverized to prepare a powder. This powder was heated in air at 600° C. to remove the nitrate groups and the acetate groups from the powder. Subsequently, the powder stripped of the nitrate groups and the acetate groups was pulverized again. The resulting powder was fired in an Ar atmosphere at 900° C. When the powder obtained through the foregoing steps was examined by X-ray diffractometry, it could be confirmed that the powder was a composite oxide having a brownmillerite type structure.

[Example 12]

In Example 12, 1.5 mol of barium acetate, and yttrium nitrate and lanthanum nitrate in amounts varied as shown in Table 3 were weighed, and dissolved in water. The resulting solutions were respectively subjected to the same steps as in Example 11 to obtain powders. When these powders were examined by X-ray diffractometry, it could be confirmed that these powders were respective composite oxides having a brownmillerite type structure.

TABLE 3

| Kind of Element | Sample 1 | Sample 2 | Sample 3 | Sample 4 | Sample 5 | Sample 6 |
| --- | --- | --- | --- | --- | --- | --- |
| Y (mol.) | 0.32 | 0.64 | 0.96 | 1.28 | 1.44 | 1.52 |
| La (mol). | 1.28 | 0.96 | 0.44 | 0.32 | 0.16 | 0.08 |

[Example 13]

In Example 13, 1.2 mol of barium acetate, 1.57 mol of yttrium nitrate and 0.03 mol of cerium nitrate were weighed, and dissolved in water. The resulting solution was pH-adjusted with aqueous ammonia with stirring to be, for example, weakly alkaline, and was further stirred until the solution became homogeneous. Subsequently, the resulting solution was heated on a hotting stirrer to remove water. The resulting precursor was then pulverized to prepare a powder. This powder was heated in air at 600° C. to remove the nitrate groups and the acetate groups from the powder. Subsequently, the powder stripped of the nitrate groups and the acetate groups was pulverized again. The resulting powder was fired in an Ar atmosphere at 900° C. When the powder obtained through the foregoing steps was examined by X-ray diffractometry, it could be confirmed that the powder was a composite oxide having a brownmillerite type structure.

[Example 14]

In Example 14, 1.5 mol of barium acetate, and yttrium nitrate and cerium nitrate in amounts varied as shown in Table 4 were weighed, and dissolved in water. The resulting solutions were respectively subjected to the same steps as in Example 13 to obtain powders. When these powders were examined by X-ray diffractometry, it could be confirmed that these powders were respective composite oxides having a brownmillerite type structure.

TABLE 4

| Kind of Element | Sample 1 | Sample 2 | Sample 3 | Sample 4 | Sample 5 | Sample 6 |
| --- | --- | --- | --- | --- | --- | --- |
| Y (mol.) | 0.32 | 0.64 | 0.96 | 1.28 | 1.44 | 1.52 |
| Ce (mol). | 1.28 | 0.96 | 0.44 | 0.32 | 0.16 | 0.08 |

An $NO_x$ decomposition test on each composite oxide having a brownmillerite type structure and obtained in each Example was carried out as an evaluation test on the $NO_x$ decomposition catalyst of the present invention under the following conditions. The NO content of a reactive gas was 800 ppm/$N_2$, the temperature of the reactive gas was 500° C., and the space velocity SV of the reactive gas was $1 \times 10^5$/h.

FIG. 1 shows differences between samples varied in A site ion and B site ion component proportion as the $NO_x$ decomposition catalyst of the present invention by taking Examples 3 and 4 as an instance. FIG. 1 is a graph showing the relationship between, the Ce/(Ba+Ce) proportion with Ba as the A site ion and Ce as the B site ion, and the rate of $NO_x$ removal. In FIG. 1, the abscissa and the ordinate represent the proportion of B site ions to the total of A site ions and B site ions, and the rate (%) of $NO_x$ removal, respectively, for plotting. As is understandable from FIG. 1, it was found out that the catalysts having a Ce/(Ba+Ce) proportion of 0% to 50% involved a high rate of $NO_x$ removal and hence had a high $NO_x$-removing capability.

Figure 2:
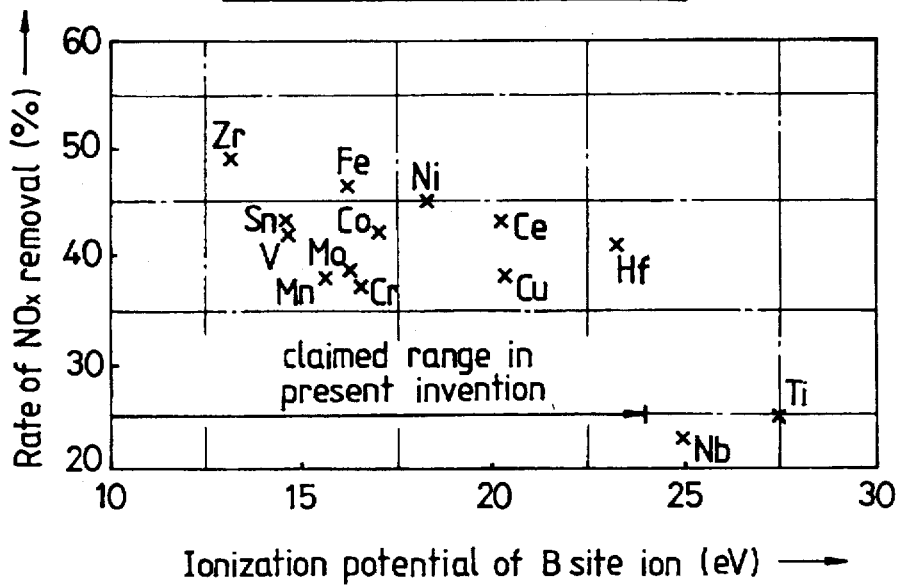
FIG. 2 is a graph showing the relationship between the ionization potential of B site ions and the rate of $NO_x$ removal in $NO_x$ decomposition catalysts according to the present invention.

FIG. 2 shows rates (%) of $NO_x$ removal by different samples prepared as the $NO_x$ decomposition catalyst of the present invention in Examples 3 to 7 while varying the B site component. As is understandable from FIG. 2, it was found out that the catalysts wherein an element providing a B site ion having a low bivalent-to-trivalent ionization potential of at most 24 eV was used as a starting material involved a high rate of $NO_x$ removal and hence had a high $NO_x$-removing capability.

Figure 3:
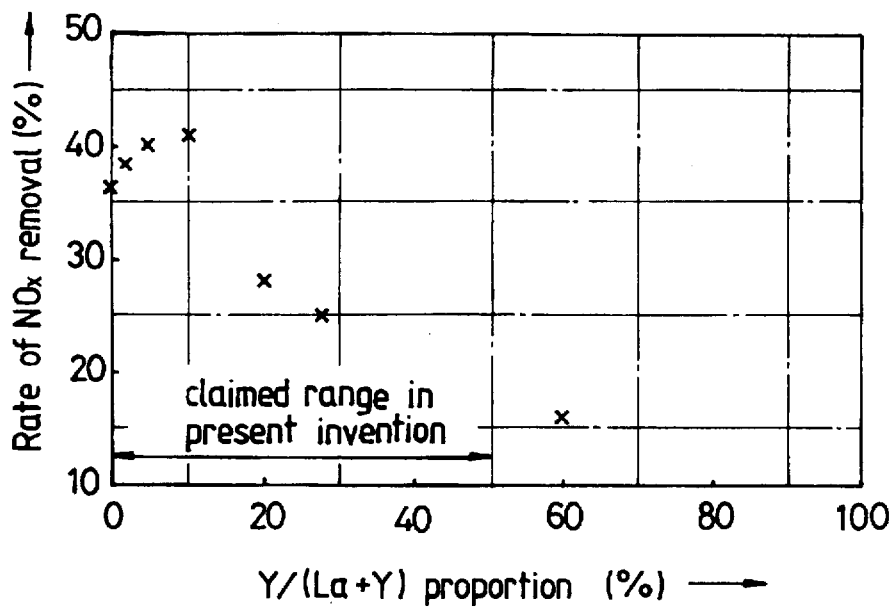
FIG. 3 is a graph showing the relationship between the proportion of D site ions (Y) to the total ions (La+Y) of C site ions (La) and the D site ions (Y), and the rate of $NO_x$ removal in $NO_x$ decomposition catalysts according to the present invention.

FIG. 3 shows rates (%) of $NO_x$ removal by different samples prepared as the $NO_x$ decomposition catalyst in Examples 11 and 12 while varying the Y/(La+Y) component proportion with La as the C site ion and Y as the D site ion. As is understandable from FIG. 3, it was found out that the catalysts having a Y/(La+Y) proportion of 0% to 50% involved a high rate of $NO_x$ removal and hence had a high $NO_x$-removing capability.

Figure 4:
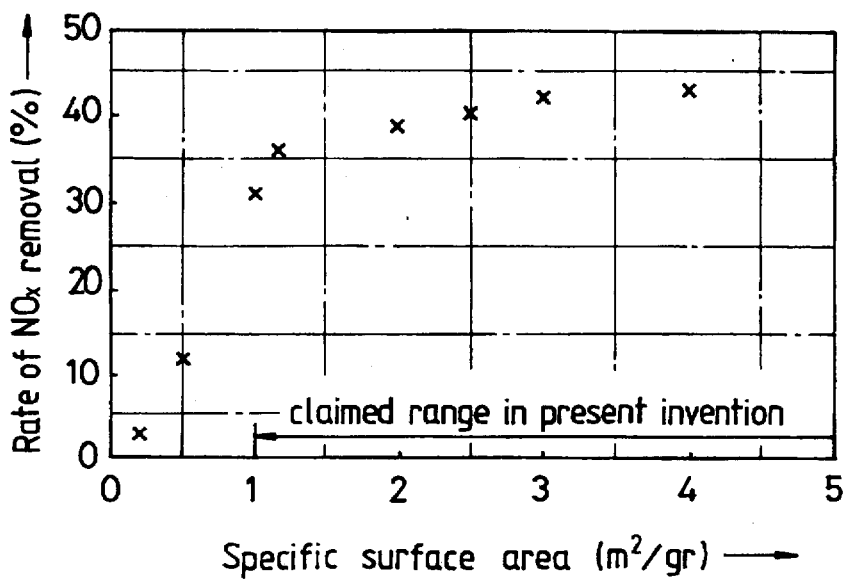
FIG. 4 is a graph showing the relationship between the specific surface area and the rate of $NO_x$ removal in $NO_x$ decomposition catalysts according to the present invention.

FIG. 4 shows the relationship between the specific surface area ($m^2$/gr) and the rate (%) of $NO_x$ removal for this $NO_x$ decomposition catalyst. As is understandable from FIG. 4, it was found out that the rate of $NO_x$ removal was impractically as low as about 12% when the specific surface area of the catalyst was smaller than 0.5 $m^2$/gr, while the rate of $NO_x$ removal was at least 30% when the specific surface area of the catalyst was at least 1 $m^2$/gr, thus demonstrating effective removal of $NO_x$. When the specific surface area of the catalyst prepared in Example 1 as this $NO_x$ decomposition catalyst was measured according to a BET method (gas adsorption method), the specific surface area of the granulated material of the catalyst was 1.17 $m^2$/gr. The specific surface area of this catalyst was 2 to 3 times as large as that of a catalyst prepared by a customary solid phase method.

[Example 15]

In Example 15, 1.3 mol of barium hydroxide, 1.57 mol of yttrium nitrate and 0.03 mol of dysprosium nitrate were weighed, and dissolved in boiling water in a nitrogen gas flow. The resulting solution was pH-adjusted while heating and stirring it to be neutral to weakly alkaline, and was further stirred until the solution became homogeneous. The resulting solution was heated on a hotting stirrer (hot plate) to remove water. Subsequently, the resulting precursor was pulverized to prepare a powder. This powder was heated in air at 600° C. to remove the nitrate groups from the powder. Subsequently, the powder stripped of the nitrate groups was pulverized again. The resulting powder was fired in an Ar atmosphere while using a furnace wherein Mo-Si was used as a heating element. When the powder obtained through the foregoing steps was examined by X-ray diffractometry, it could be confirmed that the powder was a composite oxide having a brownmillerite type structure. The carbon content of the obtained composite oxide was then measured according to a high frequency melting-infrared absorption method to find a carbon content of 0.02 wt. %.

[Example 16]

In Example 16, substantially the same procedure as in Example 15 was repeated to prepare a catalyst powder except that powder firing was effected in air instead of powder firing in an Ar atmosphere in Example 15. When the powder obtained in Example 16 was examined by X-ray diffractometry, it could be confirmed that the powder was a composite oxide having a brownmillerite type structure. The carbon content of the obtained composite oxide was then measured according to the high frequency melting-infrared absorption method to find a carbon content of 0.278 wt. %.

[Example 17]

In Example 17, substantially the same procedure as in Example 15 was repeated to prepare a catalyst powder except that a furnace wherein carbon was used as a heating element was used instead of the furnace wherein Mo-Si was used as the heating element in Example 15. When the powder obtained in Example 17 was examined by X-ray diffractometry, it could be confirmed that the powder was a composite oxide having a brownmillerite type structure. The carbon content of the obtained composite oxide was then measured according to the high frequency melting-infrared absorption method to find a carbon content of 1.24 wt. %.

[Comparative Example 1]

In Comparative Example, 1.3 mol of barium acetate, 1.57 mol of yttrium nitrate and 0.03 mol of dysprosium nitrate were weighed, and dissolved in pure water. The resulting solution was pH-adjusted with stirring to be neutral to weakly alkaline, and was further stirred until the solution became homogeneous. Subsequently, the resulting solution was heated on a heating stirrer to remove water. The resulting precursor was then pulverized to prepare a powder. This powder was heated in air at 600° C. to remove the nitrate groups and the acetate groups from the powder. Subsequently, the powder stripped of the nitrate groups and the acetate groups was pulverized again. The resulting powder was fired in an Ar atmosphere while using a furnace wherein carbon was used as a heating element. When the powder obtained through the foregoing steps was examined by X-ray diffractometry, it could be confirmed that the powder was a composite oxide having a brownmillerite type structure. The carbon content of the obtained composite oxide was then measured according to the high frequency melting-infrared absorption method to find a carbon content of 1.35 wt. %.

An $NO_x$ decomposition test on each composite oxide having a brownmillerite type structure and obtained in each of Examples 15 to 17 and Comparative Example 1 was carried out as a first evaluation test on the $NO_x$ decomposition catalyst of the present invention under the following conditions. A reactive gas comprised 800 ppm of NO, 600 ppm of $C_3H_6$ (propene), 10% of $O_2$ and the balance of $N_2$. The reaction temperature was 500° C., and the space velocity (SV) of the reactive gas was $1 \times 10^5$/h.

On the other hand, in order to examine a change in the $NO_x$-decomposing capability of each composite oxide having a brownmillerite type structure and obtained in each of Examples 15 to 17 and Comparative Example 1 after long-term service thereof, a second evaluation test was carried out as to the $NO_x$-decomposing power of each catalyst as a present invention after heat treatment thereof in air at 500° C. In this test, the conditions regarding a reactive gas, the reaction temperature and the space velocity of the reactive gas were the same as mentioned above.

Figure 5:
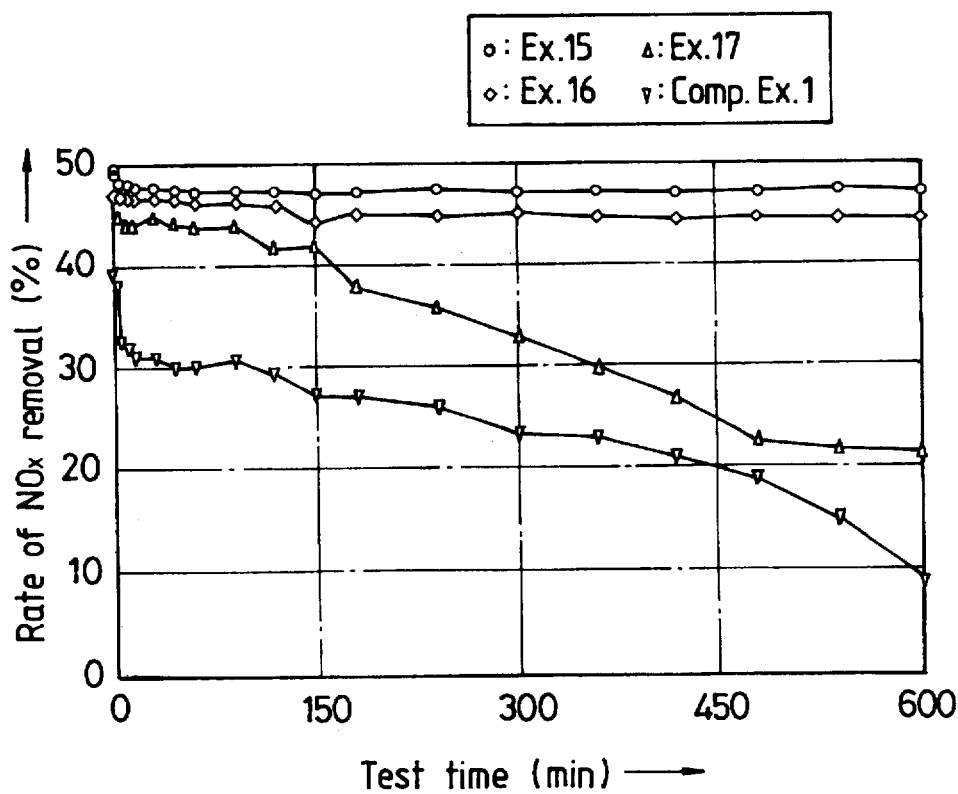
FIG. 5 is a graph showing the relationships between the elapsed time and the rate of $NO_x$ removal for composite oxides having a brownmillerite type structure and prepared by a variety of method in $NO_x$ decomposition catalysts according to the present invention.

Each composite oxide obtained in each of Examples 15 to 17 and Comparative Example 1 was examined by X-ray diffractometry after the first evaluation test and the second evaluation test to examine a change in the structure thereof. The results are shown in FIG. 5, which shows the rate (%) of $NO_x$ removal in relation to the elapsed test time (minutes) for each composite oxide. As is understandable from FIG. 5, it was found out that the composite oxides obtained in Examples 15 and 16 involved a slight decrease in the rate of $NO_x$ removal in the beginning of the test, but maintained the rate of $NO_x$ removal at a given value even after the lapse of 600 minutes of the test. On the other hand, it was found out that the composite oxide obtained in Example 17 involved a decrease in the rate of $NO_x$ removal in keeping with the lapse of time from the start of the test, but gave a rate of $NO_x$ removal of at least 20% even after the lapse of 600 minutes of the test. By contrast, it was found out that the composite oxide obtained in Comparative Example involved a sharp decrease in the rate of $NO_x$ removal in the beginning of the test and a further decrease in the rate of $NO_x$ removal in keeping with the lapse of time from the start of the test, and had an $NO_x$-decomposing power of not more than 10% in terms of rate of $NO_x$ removal after the lapse of 600 minutes of the test.

Figure 6:
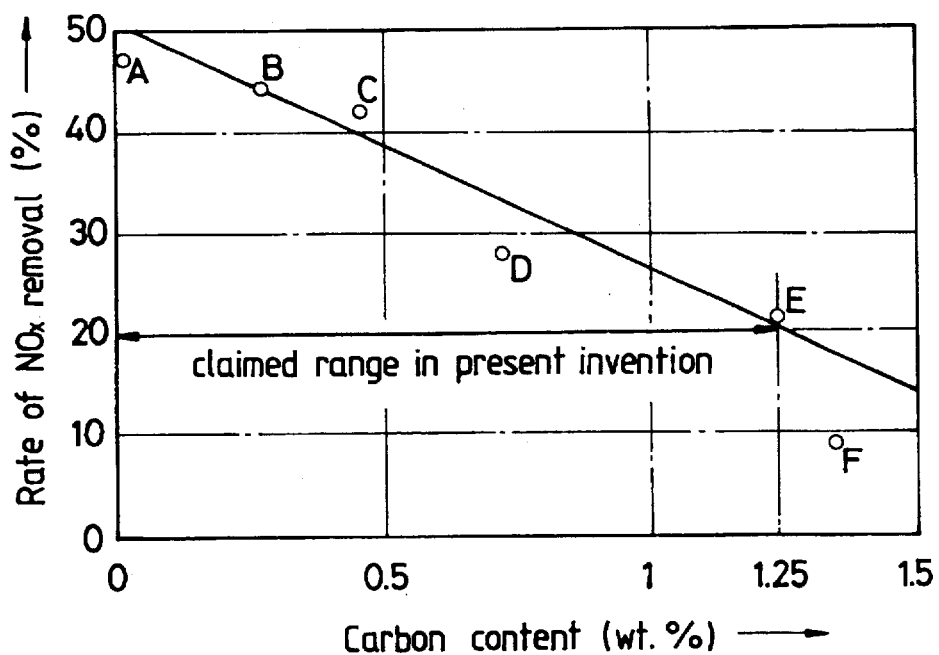
FIG. 6 is a graph showing the relationship between the carbon content 600 minutes after the start of a test and the rate of $NO_x$ removal for composite oxides having a brownmillerite type structure and prepared by a variety of method in $NO_x$ decomposition catalysts according to the present invention.

On the other hand, FIG. 6 shows the rate (%) of $NO_x$ removal in relation to the carbon content (wt. %) after the lapse of 600 minutes from the start of the test for the composite oxides obtained in Examples 15 to 17 and Comparative Example 1. The above-mentioned composite oxides after the lapse of 600 minutes from the start of the test were further examined by X-ray diffractometry to examine respective changes in the structures thereof. Although formation of barium carbonate and yttria was observed in the compound as the composite oxides of Examples 15 and 16, they mostly maintained a brownmillerite type structure. On the other hand, a brownmillerite type structure compound was the main component in the compound as the composite oxide of Examples 17, but barium carbonate and yttria were confirmed as other components. By contrast, in the compound as the composite oxide of Comparative Example, barium carbonate was the main component with a sharp decrease in the amount of a brownmillerite type structure compound.

As is understandable from FIG. 6, it was found out that the carbon content had a great influence on the rate of $NO_x$ removal. More specifically, it was found out that a carbon content of at most 1.25 wt. % in a compound oxide can maintain a rate of $NO_x$ removal of at least 20%, while a carbon content of not less than 1.25 wt. % involves an extreme decrease in the rate of $NO_x$ removal. It is believed from the foregoing that carbon contained in a composite oxide advances the thermal decomposition of the composite oxide. In FIG. 6, the point A stands for Example 15, the point B for Example 16, the point E for Example 17, and the point F for Comparative Example, while the points C and D stand for other examples of the present invention though no explanation thereof is given in the forgoing description.

Figure 7:
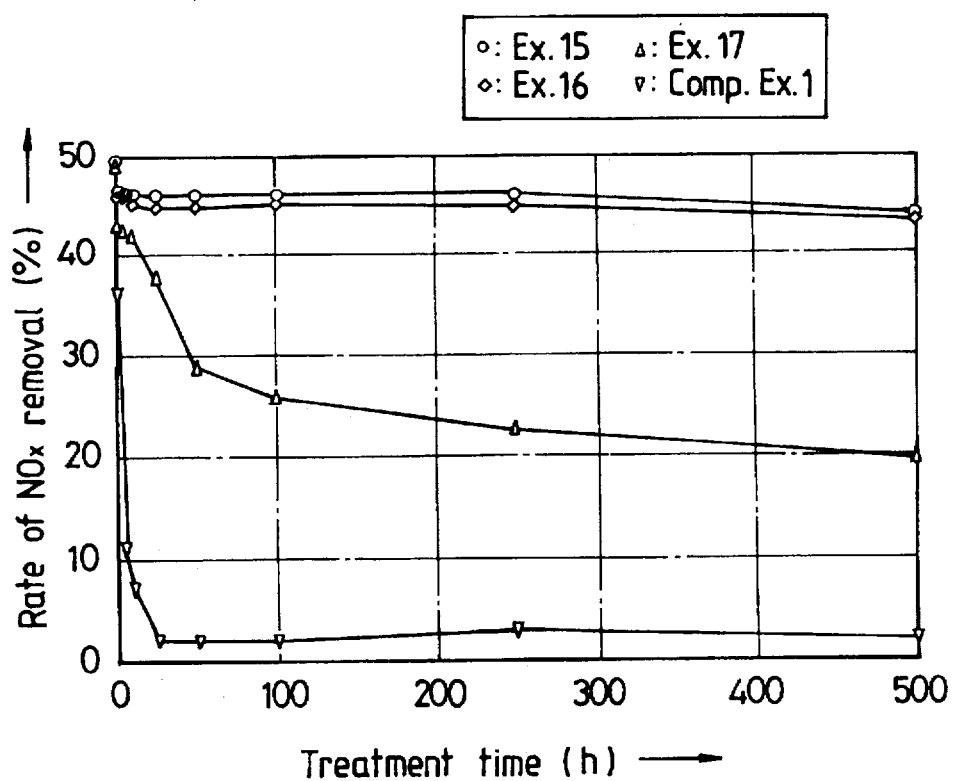
FIG. 7 is a graph showing the relationships between the time of heat treatment in air and the rate of $NO_x$ removal for composite oxides having a brownmillerite type structure and prepared by a variety of method in $NO_x$ decomposition catalysts according to the present invention.

Next, the composite oxides obtained in Examples 15 to 17 and Comparative Example 1 were subjected to heat treatment in air, followed by examination of the rate (%) of $NO_x$ removal in relation to the lapse of treatment time. The results are shown in FIG. 7. As is understandable from FIG. 7, it was found out that the composite oxides of Examples 15 and 16 involved a slight decrease in the rate of $NO_x$ removal in the beginning of the heat treatment test, but thereafter gave a stable rate of $NO_x$ removal even by the lapse of time and maintained an $NO_x$-removing power even after the lapse of 500 hours of the heat treatment. On the other hand, it was found out that the composite oxide obtained in Example 17 involved a decrease in the rate of $NO_x$ removal in keeping with the lapse of time from the start of the heat treatment test, but gave a rate of $NO_x$ removal of at least 20% even after the lapse of 500 hours of the heat treatment. By contrast, it was found out that the composite oxide obtained in Comparative Example 1 involved a rapid decrease in the rate of $NO_x$ removal in the beginning of the heat treatment test, and gave a rate of $NO_x$ removal of at most 3% after the lapse of 500 hours of the heat treatment.

The composite oxides obtained in Examples 15 to 17 and Comparative Example 1 after the lapse of 500 hours from the start of the oxidation test were also examined by X-ray diffractometry to examine respective changes in the structures thereof. Although formation of barium carbonate and yttria was observed in the compounds as the composite oxides of Examples 15 and 16, they mostly maintained a brownmillerite type structure. On the other hand, a brownmillerite type structure compound was the main component in the compound as the composite oxide of Examples 17, but barium carbonate and yttria were confirmed as other components. By contrast, in the compound as the composite oxide of Comparative Example, barium carbonate was the main component with a sharp decrease in the amount of a brownmillerite type structure compound which was confirmed by a trace peak assigned thereto.

Figure 8:
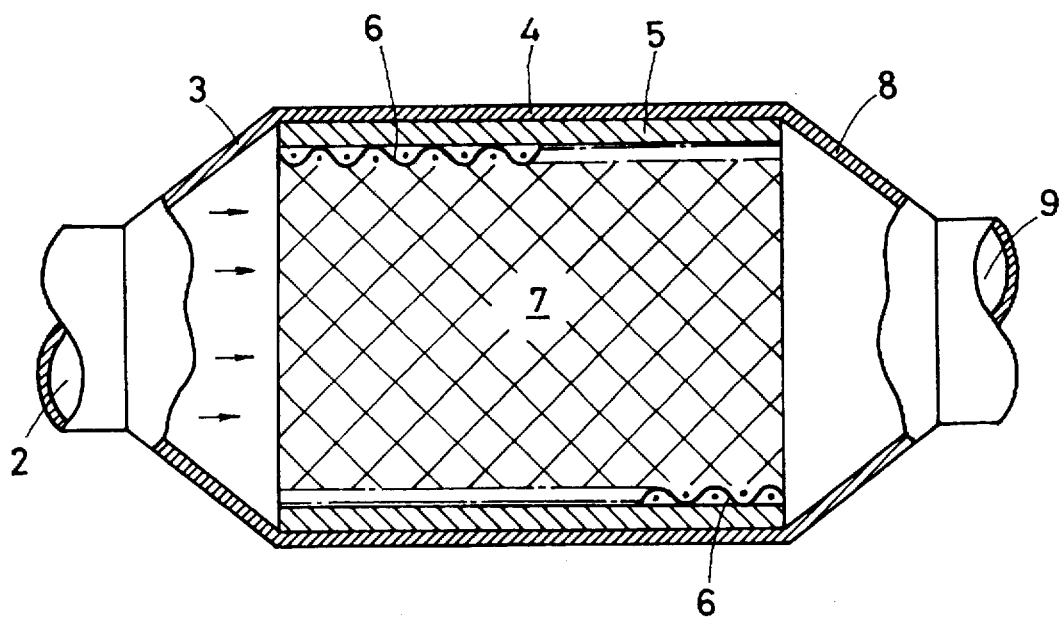
FIG. 8 is a schematic cross-sectional view illustrating an exhaust gas purifier having the $NO_x$ decomposition catalyst of the present invention incorporated thereinto.

FIG. 8 shows an exhaust gas purifier applicable to the exhaust pipe of a diesel engine having the $NO_x$ decomposition catalyst of the present invention incorporated thereinto. This exhaust gas purifier is provided with a catalyst base or catalyst carrier having a large number of narrow paths allowing exhaust gas to pass therethrough, specifically, a honeycomb carrier 7 made of a ceramic. The $NO_x$ decomposition catalyst is borne on the whole surfaces of the honeycomb carrier 7. An electric heating element 6 such as a heat-resistant wire net is bonded to the peripheral surface of the honeycomb carrier 7. The heating element 6 is covered with a heat-insulating material 5. The honeycomb carrier 7 is fitted into a cylindrical case 4. An inlet pipe 2 is bonded to one end of the case 4 with a cone 3 therebetween, while an outlet pipe 9 is bonded to the other end of the case 4 with a cone 8 therebetween. The inlet pipe 2 is connected to an exhaust pipe extending from the exhaust port of an engine, while the outlet pipe 9 is connected to a silencer via an exhaust pipe.

[Example 18]

1.2 mol of $Ba_{2.97}$, $Cu_{0.03}$, $Dy_{0.04}$, $Y_{3.96}$, $O_7$ as a brownmillerite type compound, 0.72 mol of $BAY_2O_4$ as a perovskite type compound, 0.027 mol of $BaCO_3$ as a carbonic acid salt, 0.12 mol of $Y_2O_3$ as an oxide, and 0.006 mol of $BaO_2$ as an oxide were weighed and mixed together to prepare an $NO_x$ decomposition catalyst, which was then borne on the whole surfaces of a honeycomb carrier made of a ceramic according to a customary method.

A heating element 6 was disposed around the foregoing honeycomb carrier, and covered with a heat-insulating material 5 as shown in FIG. 8 to construct an exhaust gas purifier.

[Example 19]

1.2 mol of $Ba_{2.97}$, $Cu_{0.03}$, $Dy_{0.04}$, $Y_{3.96}$, $O_7$ as a brownmillerite type compound, 0.72 mol of $BAY_2O_4$ as a perovskite type compound, 0.027 mol of $BaCO_3$ as a carbonic acid salt, 0.12 mol of $Y_2O_3$ as an oxide, and 0.006 mol of $BaO_2$ as an oxide were weighed and mixed together to prepare an $NO_x$ decomposition catalyst, which was then borne on a foam carrier made of a nickel alloy or the like according to a customary method. The foam carrier was a catalyst base or catalyst carrier having a large number of three-dimensionally irregularly crossing narrow pores or paths formed on the inside thereof to have a structure increased in area to be in contact with exhaust gas.

A heating element 6 was disposed around the foregoing foam carrier, and covered with a heat-insulating material 5 as shown in FIG. 8 to construct an exhaust gas purifier.

[Comparative Example 2]

The brownmillerite type compound as used in Examples 18 and 19 was borne on a honeycomb carrier made of a ceramic.

A heating element 6 was disposed around the foregoing honeycomb carrier, and covered with a heat-insulating material 5 as shown in FIG. 8 to construct an exhaust gas purifier.

[Comparative Example 3]

The perovskite type compound as used in Examples 18 and 19 was borne on a honeycomb carrier 7 made of a ceramic.

A heating element 6 was disposed around the foregoing honeycomb carrier 7, and covered with a heat-insulating material 5 as shown in FIG. 8 to construct an exhaust gas purifier.

Evaluation Test

Performance tests on each of the exhaust gas purifiers of Examples 18 and 19, i.e., an $NO_x$ decomposition test and a catalyst regeneration test, were carried out under the following conditions. In order to observe a change with time in the $NO_x$-removing capability of an $NO_x$ decomposition catalyst, a reactive gas (gas corresponding to engine exhaust gas) comprising 800 ppm of nitrogen oxide (NO), 400 ppm of methane gas ($CH_4$), 1% of oxygen ($O_2$) and the balance of nitrogen ($N_2$) was used at a reaction temperature of 500° C. at a reactive gas feed rate SV (flow rate per unit volume of catalyst carrier) of $1 \times 10^5$/h.

In order to examine the regenerability of an $NO_x$ decomposition catalyst, electricity was flowed through the heating element 6 of the exhaust gas purifier to heat the $NO_x$ decomposition catalyst at a temperature of 900° C. for 10 minutes.

The $NO_x$ decomposition test and catalyst regeneration test on the $NO_x$ decomposition catalyst were repeated every 2 hours to observe a change with time in the $NO_x$-removing capability of the $NO_x$ decomposition catalyst before and after regeneration thereof.

Figure 9:
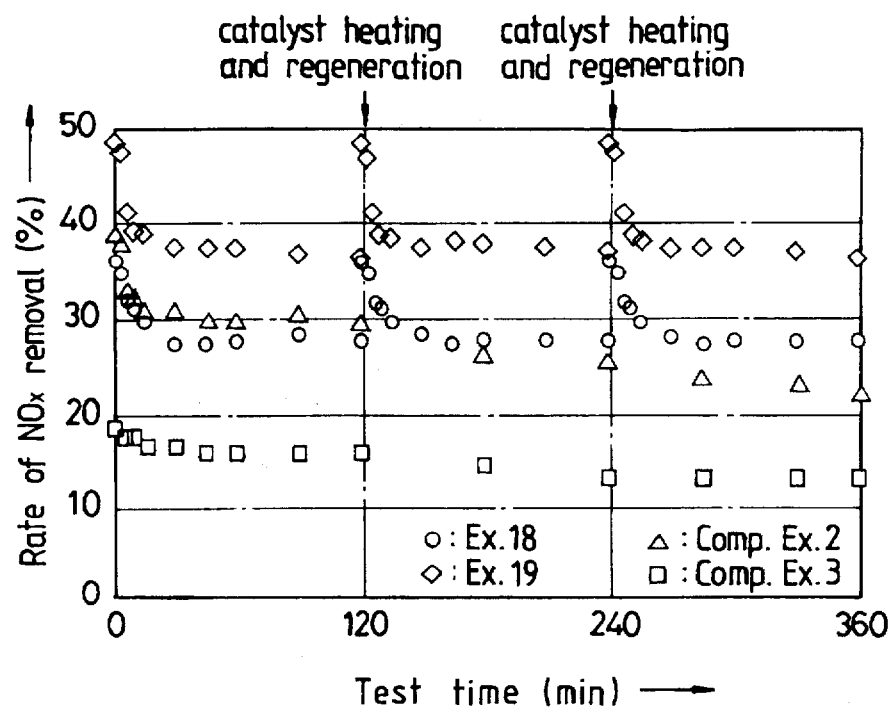
FIG. 9 is a diagram showing changes with time in the $NO_x$-decomposing capabilities of $NO_x$ decomposition catalysts according to the present invention after repeated regeneration thereof, and changes in the $NO_x$-decomposing capabilities of conventional $NO_x$ decomposition catalysts after repeated regeneration thereof.

According to the results of the foregoing tests, the $NO_x$-removing capability and the rate of $NO_x$ removal gradually lowered after the start of the $NO_x$ decomposition test, and became substantially constant after 30 minutes without further lowering thereafter as shown in FIG. 9. Electricity was flowed through the heating element (electric heater) every 2 hours after the start of the test to regenerate the $NO_x$ decomposition catalyst, whereby the $NO_x$ decomposition catalyst was restored in 5 minutes in such a way as to provide the original rate of $NO_x$ removal. In the subsequently repeated tests, the rate of $NO_x$ removal showed the same change with time as in the first test.

Figure 10:
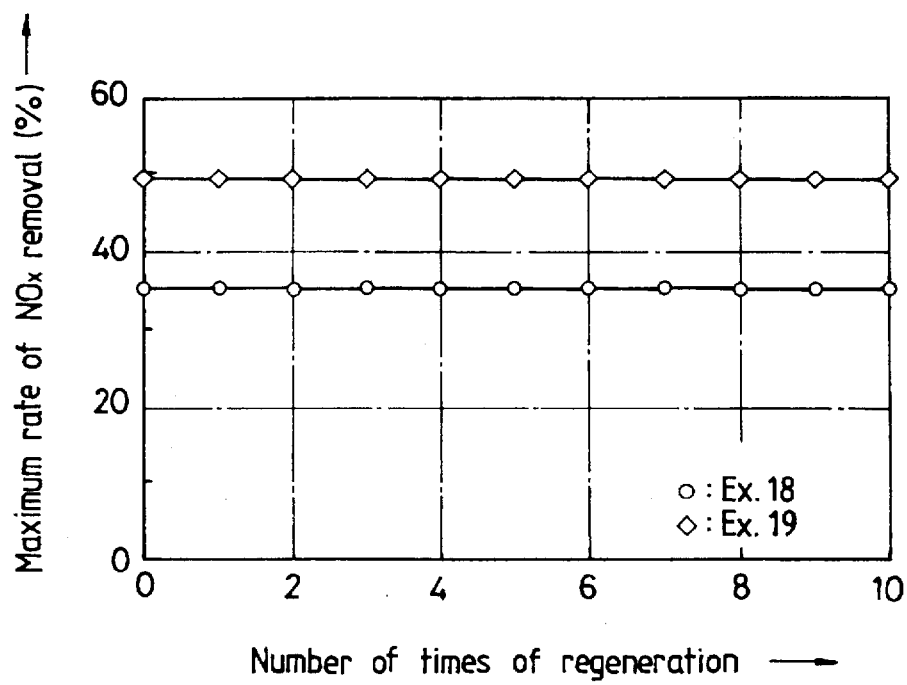
FIG. 10 is a diagram showing the maximum $NO_x$-decomposing capabilities of $NO_x$ decomposition catalysts according to the present invention after repeated regeneration thereof.

As shown in FIG. 10, no drastic changes in the structure and $NO_x$-removing capability of the catalyst were observed in this $NO_x$ decomposition catalyst even through the repeated tests involving $NO_x$ removal and catalyst regeneration. The restoration of the structure of the catalyst could also be confirmed by X-ray diffractometry of a reactive gas passed through the exhaust gas purifier.

In this $NO_x$ decomposition catalyst, it is believed that a carbonic acid salt ($BaCO_3$ or the like) as one constituent component, when heated during a reaction for removal of $NO_x$, is decomposed into an oxide and carbon monoxide, which takes oxygen from the oxide and a perovskite type compound to convert decomposition products into a brownmillerite type compound.

More specifically, the $NO_x$ decomposition catalyst of Example 18, which originally comprised $Ba_{2.97}$, $Cu_{0.03}$, $Dy_{0.04}$, $Y_{3.96}$, $O_7$, $BAY_2O_4$, $BaCO_3$, $BaO_2$ and $Y_2O_3$, was decomposed into $Ba_{2.97}$, $Cu_{0.03}$, $Dy_{0.04}$, $Y_{3.96}$, $O_7$, $BaY_2O_4$, $BaCO_3$, $BaO_2$, $Y_2O_3$, $CuO$ and $Dy_2O_3$ through exhaust gas purification, but was restored to the original structure when heated at about 900° C.

The same tests as described above were carried out in Comparative Examples 2 and 3. However, the number of times of repetition of the $NO_x$ removal test and the catalyst regeneration test was only 3. As shown in FIG. 9, the $NO_x$ decomposition catalyst of Comparative Example 2 gave a higher initial rate of $NO_x$ removal than that of Example 18, but involved no observable restoration by heating in respect of the rate of $NO_x$ removal. The $NO_x$ decomposition catalyst of Comparative Example 3 gave an initial rate of $NO_x$ removal of at most 20%, and involved no observable restoration by heating in respect of the rate of $NO_x$ removal.

What is claimed is:

1. An $NO_x$ decomposition catalyst comprising a catalyst component for $NO_x$ decomposition in the form of a compound having a brownmillerite structure represented by the general formula: $A_{3-X}B_XC_{4-Y}D_YO_Z$, wherein the A site, the B site, the C site and the D site each comprise at least 1 element selected from each corresponding group consisting of the following elements, and X, Y and Z are in the following respective ranges:

A: Mg, Ca, Sr, and Ba;

B: Ti, V, Cr, Mn, Fe, Co, Ni, Cu, Nb, Zr, Mo, Sn, Hf, Al, Ga, Ge, Tc, Ag, In, Sb, and lanthanoids;

C: lanthanoids;

D: Y and lanthanoids; and $0<X\leq1.5$, $0<Y\leq2.0$, and $7\leq Z$.

2. An $NO_x$ decomposition catalyst as claimed in claim 1, wherein the bivalent-to-trivalent ionization potential of a B site ion on said B site is at most 24 eV.

3. An $NO_x$ decomposition catalyst as claimed in claim 1, wherein said catalyst component comprises Ba on said A site; at least 1 element selected from the element group consisting of Hf, Ce, Zr, Fe, Co, Ni and Cu on said B site; Y on said C site; and at least 1 element selected from the element group consisting of La and Ce on said D site.

4. An $NO_x$ decomposition catalyst as claimed in claim 1, wherein the specific surface area thereof is at least 1 $m^2/gr$.

5. An $NO_x$ decomposition catalyst as claimed in claim 1, wherein said catalyst component for exhaust gas purification comprises said compound having a brownmillerite structure, and a carbon content of at most 1.25 wt. %.

6. An $NO_x$ decomposition catalyst for exhaust gas as claimed in claim 1, which comprises said compound having a brownmillerite structure, a perovskite structure compound containing at least 2 elements of the constituent elements of said compound; a carbonate of at least 1 element of the constituent elements of said compound, and an oxide of at least 1 element of the constituent elements of said compound.

7. An exhaust gas purifier applicable to an internal combustion engine: comprising at least one carrier selected from among a carrier having a honeycomb structure, a carrier having a foam structure, and a carrier having a fiber structure; and layers of a composition comprising said compound as set forth in claim 1 and disposed on said carrier.

8. An exhaust gas purifier applicable to an internal combustion engine: comprising at least one carrier selected from among a carrier having a honeycomb structure, a carrier having a foam structure, and a carrier having a fiber structure; and a composition comprising said compound as set forth in claim 1 and contained in said carrier.

9. An exhaust gas purifier applicable to an internal combustion engine: comprising at least one carrier selected from among a carrier having a honeycomb structure, a carrier having a foam structure, and a carrier having a fiber structure; said compound as set forth in claim 1 which is borne on said carrier; a heating element disposed around said carrier; and an insulating material covering said carrier having said heating element disposed therearound.

* * * * *